Feb. 17, 1953  J. F. MAGGART  2,628,863
IRRIGATION MACHINE
Filed Oct. 2, 1950  3 Sheets-Sheet 1
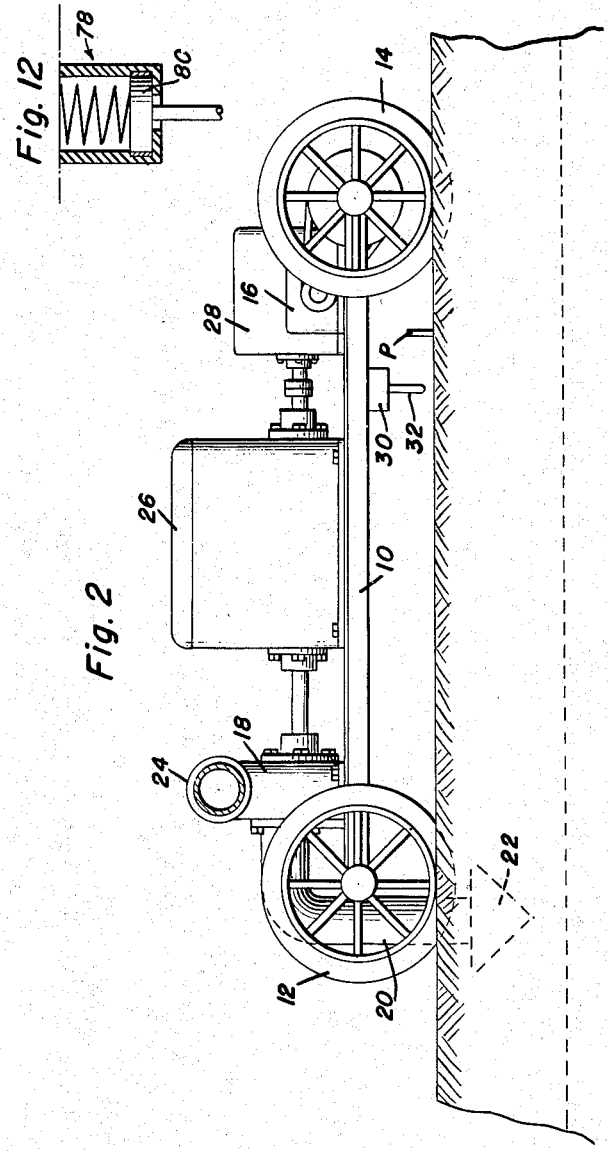
Inventor
Joel F. Maggart
By Clarence A. O'Brien
and Harvey B. Jacobson
Attorneys Feb. 17, 1953   J. F. MAGGART   2,628,863
IRRIGATION MACHINE
Filed Oct. 2, 1950   3 Sheets-Sheet 2
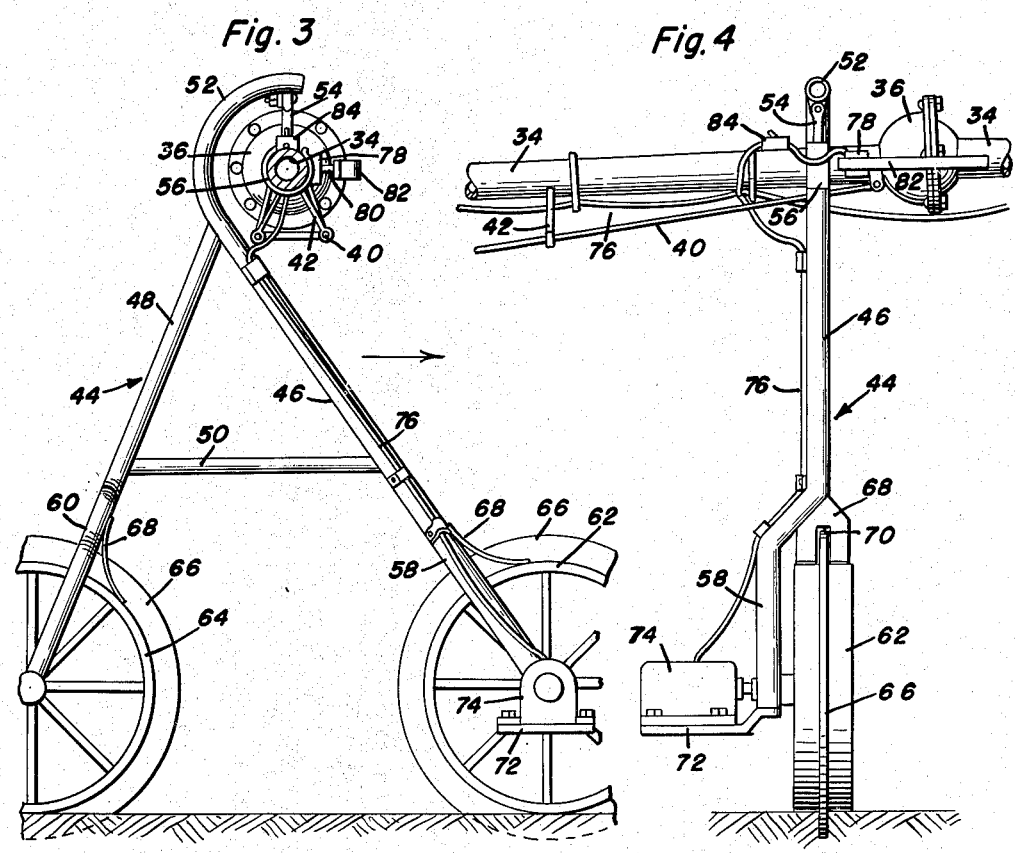
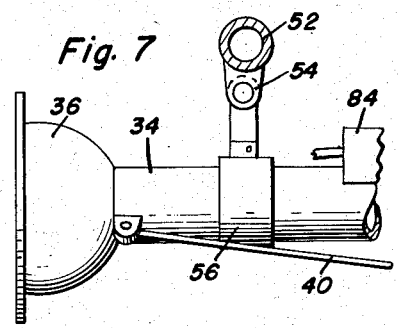
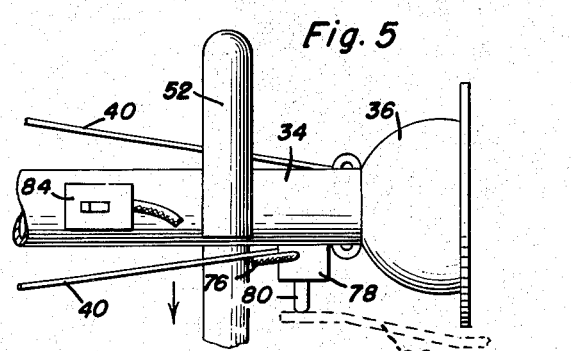
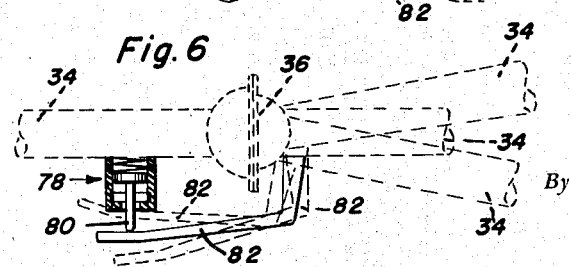
Inventor
Joel F. Maggart
By *Clarence A. O'Brien and Harvey B. Jacobson*
Attorneys

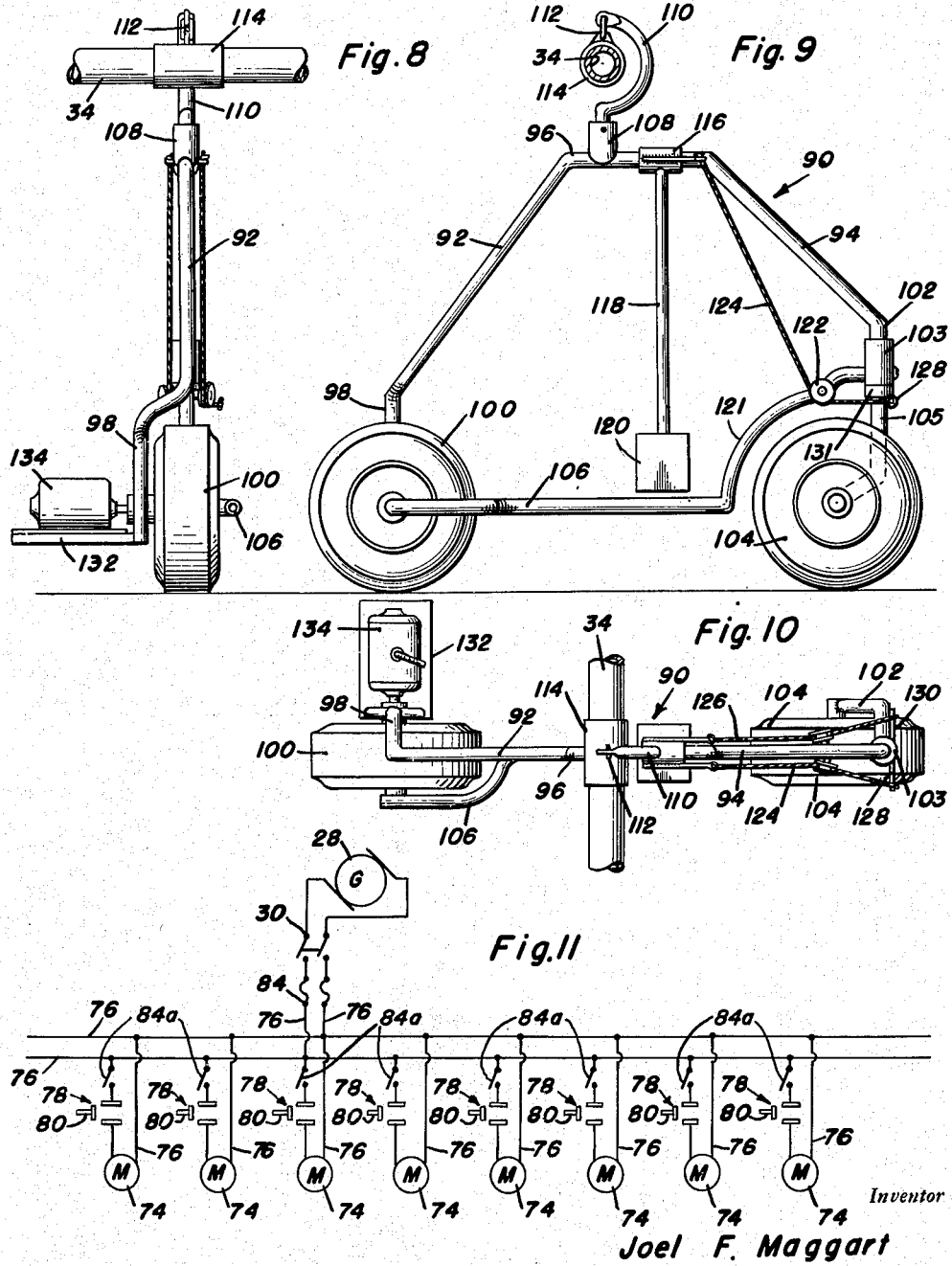

Patented Feb. 17, 1953

2,628,863

UNITED STATES PATENT OFFICE 2,628,863

IRRIGATION MACHINE

Joel F. Maggart, Elmwood, Tenn.

Application October 2, 1950, Serial No. 187,867

7 Claims. (Cl. 299—52)

This invention relates to new and useful improvements in irrigation machines and the primary object of the present invention is to provide an apparatus that will travel over the soil to apply water to the soil, regardless of whether or not the ground is completely level and avoiding the costly portable pipe systems frequently employed.

Another very important object of the present invention is to provide an irrigation machine including a plurality of flexibly joined delivery pipes mounted on power-driven wheels and a novel and improved means for retaining the pipes lined up to prevent one pipe from moving ahead or lagging behind an adjacent pipe.

Yet another object of the present invention is to provide an irrigation machine including a wheeled frame having a power unit thereon for moving the frame and a pump on the frame and having a depending inlet that will travel through a supply trough or ditch to direct water in the ditch through supply pipes mounted on wheeled supports adjacent the frame.

A further object of the present invention is to provide an irrigation machine of the aforementioned character including a switch for the power means having a depending switch arm that will engage a post or stop placed in the ground after the machine has moved a predetermined distance or to a different grade, to effect a stopping of the machine.

A still further aim of the present invention is to provide an irrigation machine that is extremely simple and practical in construction, strong and reliable in use, efficient and durable in operation, inexpensive to manufacture, service and operate, and which embodies a novel and improved wheeled support for each delivery tube.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary rear elevational view of the present invention in use;

Figure 2 is an enlarged vertical sectional view taken substantially on the plane of section line 2—2 of Figure 1;

Figure 3 is an enlarged end view of Figure 1 to illustrate one of the wheeled supports;

Figure 4 is a front view of Figure 3;

Figure 5 is an enlarged fragmentary plan view of one of the supply pipes and showing a switch operator, in dotted lines, in position to the switch on the supply pipe;

Figure 6 is a diagrammatic view showing the manner in which a support switch is actuated by a movement of one pipe relative to an adjacent pipe;

Figure 7 is a rear elevational view of Figure 5 and with part of the support broken away;

Figure 8 is a front elevational view of one of the supports in modified form;

Figure 9 is a side view of Figure 8;

Figure 10 is a plan view of Figure 9;

Figure 11 is a diagrammatic view of the circuit used with the supports shown in Figures 1–10, inclusive; and Figure 12 is an enlarged fragmentary view of Figure 6.

Referring now to the drawings in detail, wherein, for the purpose of illustration, there is disclosed a preferred embodiment of the present invention, and more particularly referring to Figures 1–7, inclusive, the numeral 10 represents a wheeled frame or carriage having a rear pair of wheels 12 and a forward pair of wheels 14. An electrically operated gear motor 16 is mounted on the frame and is operatively connected to the forward wheels 14 for driving the wheels 14 and thereby causing the frame to move over the ground.

A well-known pump 18 is supported on the frame 10 and includes a depending inlet 20, preferably in the form of a flexible tube, whose lower end supports a porous cone 22. The pump 18 also includes a substantially horizontal outlet 24. A well-known type of engine 26 is also mounted on the frame 10 and is operatively connected to the pump 18 and to a generator 28 mounted on the frame 10. The generator 28 is also operatively connected to the gear motor 16 in any suitable manner.

A switch 30 is mounted beneath the frame 10 and includes a switch member or swinging switch arm 32. The switch 30 is electrically connected to the gear motor 16 or generator 28 so that the gear motor may be selectively actuated or deactuated. The switch arm 32 is adapted to be engaged by a post P inserted in the ground to cause the arm 32 to be moved to its circuit open position and thereby arrest movement of the frame after the frame has moved a predetermined distance or to a change in slope of the ground.

A plurality of supply pipes or perforated tubes 34 are associated with each side of the frame 10. The innermost tubes 34a of the tubes 34 are not perforated and are coupled to the two outlet sides of the outlet 18, and the adjacent ends of adjacent tubes 34 are coupled together by complementary flexible ball and socket or such other universal coupling joints 36 so that the tubes may slope relative to each other. All but the innermost of the tubes 34 support a plurality of depending spray nozzles 38 that constitute the delivery means for liquid passing through the tubes from the pump.

The tubes 34 are reinforced and strengthened by groups of rods or bars 40 that are terminally pivoted to the ends of the tubes 34. Spacer arms 42 are attached to and project radially from the tubes 34 and these arms are secured to the rods 40.

Each of the tubes 34, 34a is supported by at least one wheeled support 44. These supports 44 comprise forward and rear upwardly converging and joined bars or rods 46 and 48 that are connected by connecting bars 50. The upper ends of the bars 46 are bent to form forwardly extending hook portions or loops 52 that pivotally support hangers 54 having resilient bands 53 which embrace the tubes 34, 34a.

The bars 46 and 48 are provided with lower offset ends 58 and 60 that support the axles of forward and rear wheels 62 and 64. The wheels 62 and 64, also the wheels 12 and 14 of the frame, are provided with peripheral flanges 66 that will penetrate the ground to prevent shifting of the supports from their intended direction of travel.

Resilient plates or fingers 68 are fixed to the offset ends 58 and 60, and include slots 70 that receive the flanges 66. The plates 68 will scrape dirt collecting on the wheels 62, 64 and thereby will tend to retain the wheels 62, 64 free of dirt.

Platforms 72 are secured to the ends 58 and support electric gear motors 74 whose drive shafts are connected to the axles of the wheels 62 for driving the latter. Electric wires 76 extend from the motors 74, are clamped to the supports 44 and to the tubes 34, 34a, and are connected to the generator 28. Each motor 34 is provided with a switch 78 having a spring urged switch member or plunger 80. The switches 78 are mounted on the tubes 34, 36 and are disposed at the outer ends of the tubes 34, 34a.

The inner end of each tube 34 supports a rigid arm or switch operator 82 that extend across the couplings 36 to engage the plungers 80 of switches 78. A master switch 84 is connected to the wires 76 for controlling all of the motors 73, and a plurality of switches 84a are electrically connected to each of the switches 78 and control the current to the individual motors 74.

In practical use of the present invention, as described for Figures 1-7, inclusive, the engine 26 is started to permit the frame 10 to travel over the ground and, more particularly, over a ditch D in which the inlet 20 is placed. As the frame 10 moves forwardly, the pump 18 will direct water through the tubes 34a, 34 and the water will be disposed on the ground through the nozzles 38. Obviously, a flexible supply hose may be attached to the pump if a ditch is not available.

Should one of the tubes 34 move in advance of an adjacent tube, the arm 82 of the lagging tube will engage the switch member 80 of the leading tube to open the circuit to the leading tubes motor 74 until the lagging tube is advanced by its motored support into alignment with the leading tube. The motors 74 will remain in operation as long as the tubes are aligned but should one support be moved ahead of another support then the circuit to the motor of the support moving ahead will be opened until the lagging support moves up to the other support.

Reference is now directed to Figures 8-11, inclusive, wherein there is disclosed the wheeled supports in modified form. In this embodiment, the wheeled supports are designated by the numeral 90 and consist of forward and rear upwardly converging bars 92 and 94 whose upper ends are joined by a cross bar 96.

The lower end of the bar 92 is offset to form a portion 98 that supports a forward wheel 100. The lower end 102 of the bar 94 supports a vertical bearing 103 in which the vertical portion of an offset wheel supporting member 105 is rotatably mounted. The member 105 supports a forward wheel 104 and the bearing 103 is connected to the offset end 98 by a connector bar 106.

A sleeve 108 rises from the bar 96 and supports a hook member 110 to which a hanger member 112 is pivotally mounted. The hanger member 112 includes a ring or collar 114 that embraces the tube 34.

A sleeve 116 is rotatably mounted on the crossbar 96 and supports a depending arm 118 to which there is secured a block or weight 120. The forward upwardly curved portion 121 of the connector bar 106 supports a pair of guide rollers 122 over which a pair of cords 124 and 126 are trained. The cords 124 and 126 are attached to the sleeve 116 and to arms 128 and 130 projecting radially from diametrically opposite sides of a collar 131 that is held on the member 105 below the bearing 103.

The support 90 automatically maintains a near plumb position, since, when it is out of plumb, the elements 118, 120 move to their vertical position to tension one of the cords and thereby turn or rotate the member 105 in order to maintain the support 90 in its plumb or vertical position. Due to the means acting on the support to retain it in its vertical position, pneumatic wheels 100, 104 may be employed.

The offset end 98 of the bar 92 supports a platform 132 on which an electric motor 134 is mounted. The drive shaft of the motor 134 is operatively connected to the wheel 100 to drive the latter and the motors 134 of the groups of supports 90 are connected to the generator on the wheeled frame as previously described in Figures 1-7, inclusive, through the medium of a switch for each motor 134 that will be actuated by arms 82 on the tubes 34.

Having described the invention, what is claimed as new is:

1. An irrigation machine comprising a wheeled frame, a pump mounted on the frame and having an outlet and a depending inlet adapted to pass through a water-filled ditch, a plurality of delivery tubes, one of said tubes being attached to the outlet of said pump, flexible couplings joining adjacent tubes, a wheeled support for each tube, said supports each including a drive wheel, a source of electric current on said frame, an electric motor mounted on each support and connected to said drive wheels for driving the latter, a switch for each motor, and means carried by each tube for actuating the switch associated with an adjacent tube in response to a movement of one tube forwardly relative to an adjacent tube.

2. An irrigation machine comprising a wheeled frame, a pump mounted on the frame and having an outlet and a depending inlet adapted to pass through a water-filled ditch, a plurality of delivery tubes, one of said tubes being attached to the outlet of said pump, flexible couplings joining adjacent tubes, a wheeled support for each tube, said supports each including a drive wheel, a source of electric current on said frame, an electric motor mounted on each support and operatively connected to the drive wheels for driving the latter, said motors being electrically connected to the source of electric current, a switch for each motor including a sliding switch member, and an arm rigidly secured to each tube, said arms engaging said switch members of adjacent tubes to actuate said switches upon selective movement of one tube forwardly relative to an adjacent tube.

3. An irrigation machine comprising a wheeled frame, a pump mounted on said frame and including a depending inlet and a horizontal outlet, means mounted on the frame and operatively connected to the pump for operating the latter and also operatively connected to at least one wheel of the frame for moving the frame over a water-filled ditch in which the inlet is positioned, a plurality of perforated tubes, flexible connectors joining adjacent tubes, at least one of said tubes being connected to said outlet to permit fluid to be delivered to the tubes from the pump, a wheeled support for each tube, said means including an electric motor, and a switch connected to the motor and including a swingable switch arm depending from the frame and adapted to engage a post inserted in the ground after the frame has moved a predetermined distance to open a circuit to the motor, and an electric motor on each support, said supports each including a drive wheel, said motors on said supports being connected to a source of current and also operatively connected to the drive wheels, a switch for each motor on the supports, and a switch operator carried by each tube for engaging and actuating a switch of an adjacent tube upon movement of one tube forwardly relative to an adjacent tube.

4. The combination of claim 3 wherein said drive wheels include peripheral flanges for penetrating the ground.

5. The combination of claim 4 and a resilient plate carried by each support, said plates overlying the drive wheels and having slots receiving said flanges.

6. An irrigation machine comprising a wheeled frame, a pump mounted on the frame and having an outlet and a depending inlet adapted to pass through a water-filled ditch, a plurality of delivery tubes, one of said tubes being attached to the outlet of said pump, flexible couplings joining adjacent tubes, a wheeled support for each tube, said supports each including a drive wheel, a power means on each support, said power means being operatively connected to said drive wheels, said supports each including a steering wheel, and means mounted on said supports and connected to said steering wheels for retaining the supports plumb.

7. The combination of claim 6 wherein said last-named means includes a pendulum on each support, and a pair of flexible connectors between the pendulums and the steering wheels.

JOEL F. MAGGART.

REFERENCES CITED

The following references are of record in the file of this patent:

UNITED STATES PATENTS

| Number | Name | Date |
|---|---|---|
| 1,085,609 | Heath | Feb. 3, 1914 |
| 1,321,350 | Alvarez | Nov. 11, 1919 |
| 1,468,860 | Foley | Sept. 25, 1923 |
| 1,966,783 | Balaam | July 17, 1934 |
| 2,563,519 | Egly | Aug. 7, 1951 |

FOREIGN PATENTS

| Number | Country | Date |
|---|---|---|
| 414,551 | Germany | June 9, 1925 |